(12) United States Patent
Myhre et al.

(10) Patent No.: US 7,517,941 B2
(45) Date of Patent: Apr. 14, 2009

(54) SHRINK FILM

(75) Inventors: Ole Jan Myhre, Stathelle (NO); Merete Skar, Stathelle (NO); Hans Georg Daviknes, Stathelle (NO); Kjetil Larsen Borve, Stathelle (NO); Geir Morten Johansen, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/523,424

(22) PCT Filed: Jul. 29, 2003

(86) PCT No.: PCT/GB03/03223

§ 371 (c)(1),
(2), (4) Date: Nov. 16, 2005

(87) PCT Pub. No.: WO2004/011546

PCT Pub. Date: Feb. 5, 2004

(65) Prior Publication Data

US 2006/0106182 A1 May 18, 2006

(30) Foreign Application Priority Data

Jul. 29, 2002 (GB) .................... 0217522.2

(51) Int. Cl.
*B65B 53/02* (2006.01)
*C08L 23/08* (2006.01)
*B32B 27/32* (2006.01)

(52) U.S. Cl. .............. 526/348.1; 525/240; 264/230; 428/500; 53/122; 53/127; 53/442

(58) Field of Classification Search ............ 526/348.1; 525/240; 264/230; 428/500; 53/122, 127, 53/442
See application file for complete search history.

(56) References Cited

U.S. PATENT DOCUMENTS

| 4,814,135 A | 3/1989 | Heitz .................. 264/564 |
| 5,539,076 A | 7/1996 | Nowlin et al. ............ 526/348.1 |
| 6,147,167 A | 11/2000 | Mack et al. ............. 525/333.8 |

FOREIGN PATENT DOCUMENTS

| EP | 0 404 368 | | 12/1990 |
| EP | 404368 A2 | * | 12/1990 |
| EP | 773257 | * | 5/1997 |
| EP | 0 773 257 | | 4/2003 |
| GB | 2 097 324 | | 11/1982 |
| WO | 99/03902 | | 1/1999 |
| WO | WO 99/03902 | * | 1/1999 |
| WO | WO 99/41310 | * | 8/1999 |
| WO | 99/55775 | | 11/1999 |

* cited by examiner

*Primary Examiner*—Roberto Rábago
(74) *Attorney, Agent, or Firm*—Ohlandt, Greeley, Ruggiero & Perle, L.L.P.

(57) ABSTRACT

A shrink film comprising a polyethylene film of thickness 5 to 500 μm, wherein the polyethylene comprises an ethylene homopolymer-copolymer mixture having a molecular weight distribution in the range of 5 to 40, and a weight average molecular weight of at least 100 kD.

22 Claims, No Drawings

SHRINK FILM

FIELD OF THE INVENTION

This invention relates to polyethylene shrink films and to processes for their preparation and their uses as packaging materials.

DISCUSSION OF THE BACKGROUND ART

Shrink films are polymer films which on application of heat shrink in one or both directions. They are widely used as packaging and casing materials for both large and small products (e.g. industrial pallets, bottles, magazines, etc), generally with thicker films being used for larger items and thinner films for smaller items.

At present, the most widely used material for shrink film production is low density polyethylene (LDPE), optionally blended with other polymers to achieve a desired balance of properties (e.g. stiffness) and cost. LDPE shrink films may also include a coextruded polypropylene layer to reduce the incidence of fusion of the LDPE layer to shrink film wrapped objects during the heat treatment to shrink the film. These commonly used LDPE or LDPE-rich shrink films however suffer from various problems. In particular, the shrink film has insufficient mechanical strength for many end uses, the occurrence of hole formation during the shrinking process is undesirably high, and the holding force of the shrink film is undesirably low.

Shrink film is produced by extrusion through an annular die with a pressure difference applied to blow the extruded cylinder into a film and achieve the desired orientation within the film, i.e. to build a stress into the cooled film. Heat treatment results in stress relaxation and, as a result, shrinkage. Most of the shrinkage occurs while the film is at its hottest (generally ca. 120-130° C.) during the heat treatment; however the film continues to shrink as it cools. These are referred to as the hot shrink and the cold shrink respectively and for a polymer to function adequately as the base material for a shrink film it must meet the different requirements (in terms of melt strength, cold strength and other mechanical properties) of the hot shrink, cold shrink and post-shrinkage stages.

We have now found that these requirements are particularly well met, particularly for relatively thin shrink films, by linear low density polyethylenes (LLDPE) having a high molecular weight distribution (MWD) and containing an ethylene homopolymer and an ethylene copolymer. (The term MWD refers to the ratio (Mw/Mn) between the weight average molecular weight (Mw) and the number average molecular weight (Mn) of a polymer).

SUMMARY OF THE INVENTION

Thus, viewed from one aspect the invention provides a shrink film comprising a low density polyethylene film of thickness 5 to 500 µm, e.g. 20 to 120 µm, preferably 30 to 110 µm, especially 40 to 100 µm, characterized in that said low density polyethylene comprises an ethylene homopolymer-copolymer mixture having a molecular weight distribution in the range 5 to 40, preferably 10 to 35, and a weight average molecular weight of greater than 100 kD, e.g. 150 to 300 kD (more preferably 200 to 280 kD, and especially greater than 230, e.g. 230 to 270 kD).

Viewed from another aspect the invention provides the use of a polyethylene composition comprising an ethylene homopolymer-copolymer mixture having a molecular weight distribution in the range 5 to 40, and a weight average molecular weight of at least 100 kD in the manufacture of a shrink film.

DETAILED DESCRIPTION OF THE PREFERRED EMBODIMENT

In the shrink film of the invention, the homopolymer component preferably has a higher density and lower weight average molecular weight than the copolymer component. Generally, the density of the homopolymer component should be in the range 960 to 980 kg/m$^3$ while the density of the copolymer should be in the range 890 to 920 kg/m$^3$. The overall density of the homopolymer-copolymer mixture is preferably in the range 920 to 945 kg/m$^3$, e.g. 925 to 935 kg/m$^3$, especially 930 kg/m$^3$.

The ratio of homopolymer to copolymer component in the mixture can vary widely. Preferably however, the ratio (by wt) is between 1:10 to 10:1 homopolymer to copolymer, especially 1:5 to 5:1, e.g. 1:3 to 3:1. In a most preferred embodiment there should be 40-60% homopolymer to 60-40% copolymer in the mixture. An especially preferred ratio is a slight excess of homopolymer.

The shrink film of the invention may if desired be a multilayer film, e.g. incorporating a polypropylene protective layer as mentioned above, and a homopolymer-copolymer mixture layer. This layer may also comprise other components besides the homopolymer-copolymer mixture, e.g. coloring agents, other polymers, etc. Generally however such other components will make up no more than 40% wt, more preferably no more than 25% wt, and especially no more than 10% wt of the homopolymer-copolymer mixture layer. However, more preferably the homopolymer-copolymer mixture layer contains no more than 5% wt of any further polymer and ideally this layer consists essentially of the homopolymer to copolymer mixture.

Viewed from a further aspect therefore the invention provides a shrink film comprising a heat-shrinkable polyethylene layer in which the polymer content of said layer is at least 95% wt, preferably at least 99% wt, and comprising an ethylene homopolymer-copolymer mixture having a molecular weight distribution in the range 5 to 40 and a weight average molecular weight of at least 100 kD (more preferably 150 to 300 kD, e.g. 200 to 280 kD, and especially 230 to 270 kD).

In the shrink films of the invention the thickness of the homopolymer-copolymer mixture layer (i.e the thickness in the non-shrunk film) varies depending on whether this forms part of a one layer or multilayer structure. However, a preferred thickness is 20 to 200 µm, more preferably 40 to 110 µm, especially when the homopolymer/copolymer mixture layer forms part of a multilayer film. Accordingly, the films of the invention are particularly suitable for wrapping pallets carrying for example up to 1500 kg loads or wrapping relatively small loads, e.g. having a weight per package of 750 kg or less, more preferably 50 kg or less. Examples of such loads include magazines, books, bottles, sets of bottles (e.g. with 2 to 12 in a set), etc.

The shrink films of the invention have particularly good properties not just in terms of their performance during the film shrinking operation but also in terms of the mechanical properties of the shrunk film itself. Thus, the shrink film has a particularly beneficial combination of very low hot shrink force and very high cold shrink force. The low hot shrink force serves to reduce hole formation during the shrinking operation (a major problem with conventional shrink films) while the high cold shrink forces provide excellent holding properties, i.e. they serve to stabilize the shrink-wrapped product. Moreover, the shrunk film has mechanical properties (e.g. dart drop and tensile strength) which are improved relative to conventional shrink films, especially at very low temperatures. As a result the shrink films of the invention are especially suited for use in packaging products which will be exposed to low temperatures during transportation or storage. The excellent mechanical properties of the shrunk film are thought to arise at least in part from the fact that the polymer is a homopolymer-copolymer rather than copolymer-copolymer mixture. This combination of properties relevant to shrink wrapping is both unexpected and highly advantageous.

The MWD of the homopolymer-copolymer mixture is a central parameter in achieving the desired properties of the shrink film. The required MWD of 5 to 40, preferably 10 to 35 indicates a broad range of molecular weights for the homopolymer-copolymer mixture. Preferably the MWD is in the range 15 to 25. Such MWD values can be achieved in a variety of ways all of which are considered to fall within the scope of the invention, e.g. by blending two or more ethylene polymers having different molecular weight profiles, by multistage (e.g. two or more stage) ethylene polymerization whereby to generate polyethylenes having different molecular weight profiles in different polymerization stages, etc. Particularly preferably however the homopolymer-copolymer mixture is produced by multistage ethylene polymerization using a sequence of different reactors, e.g. as described in WO 92/12182, preferably at least one being a slurry loop reactor and another being a gas phase reactor. The two stage sequence loop reactor then gas phase reactor is especially preferred. The polymerization catalysts used in the ethylene polymerization may be any catalysts capable of producing a polyethylene with the desired molecular weight profile, however metallocene and more especially Ziegler Natta catalysts are preferred, particularly such catalysts in heterogeneous or supported form. Metallocene and Ziegler Natta catalysts capable of appropriate ethylene polymerization are well known and are described for example in WO 98/46616 and EP-A-443374.

Where the homopolymer-copolymer mixture is produced as a bimodal polymer in a two-stage polymerization, the initial stage product preferably has a low molecular weight with a density of at least 960 kg/m$^3$ (e.g. 965 to 975 kg/m$^3$) and an MFR$_{2.16}$ (190° C.) of at least 100 g/10 min (e.g. 110 to 3000 g/10 min) and the bimodal product preferably has a density of 920-945 kg/m$^3$ (e.g. 923 to 935 kg/m$^3$), a MFR$_{2.16}$ (190° C.) of 0.05 to 1.2 g/10 min (e.g. 0.1-0.8 g/10 min), a weight average molecular weight (Mw) of 150000 to 300000 D (preferably 200000 to 280000D, more preferably 230000 to 270000D), and a MWD of 10 to 35 (preferably 15 to 25).

Such a homopolymer-copolymer mixture may be produced according to the technique described in WO 99/41310 using a slurry loop reactor followed by a gas phase reactor, with a density of 931 kg/m$^3$, weight average molecular weight (Mw) of 240000D, MFR$_{2.16}$ (190° C.) of 0.2 g/10 min, and an MWD of 22.

In such a two-stage polymerization process, the first stage is preferably an ethylene homopolymerization with the second stage being a copolymerization.

The comonomer used in the copolymer is preferably a $C_{3-12}$ alpha olefin or a mixture of two or more $C_{3-12}$ alpha olefins, e.g. 1-butene, 1-pentene, 1-hexene, 4-methyl-1-pentene, 1-heptene, 1-octene, 1-nonene and 1-decene, with 1-butene and 1-hexene being preferred. Hence, the term "copolymer" as used herein is intended to cover terpolymers as well. A preferred terpolymer of use in the invention is an ethylene/butene/hexene terpolymer. The comonomer incorporation in a copolymerization reaction is preferably 2 to 10% mole relative to ethylene, especially 4 to 8% mole.

In the homopolymerization stage, while no comonomer is added it will be appreciated that the ethylene source may contain trace amounts of $C_{3+}$ hydrocarbons copolymerizable with ethylene that may thus become incorporated into the ethylene homopolymer. It is well understood in the industry that the polymer product is nonetheless considered to be an ethylene homopolymer.

For film formation using a polymer mixture it is important that the different polymer components be intimately mixed prior to extrusion and blowing of the film as otherwise there is a risk of inhomogeneities, e.g. gels, appearing in the film. Thus, particularly where the homopolymer-copolymer mixture is produced by blending, it is especially preferred to thoroughly blend the components, for example using a twin screw extruder, preferably a counter-rotating extruder.

Examples of further polymer materials which may be incorporated into the homopolymer-copolymer mixture layer in the shrink films of the invention include ethylene homo- and co-polymers, and high pressure (HP) copolymers (e.g. ethyl butyl acrylate (EBA), ethyl methacrylate (EMA), and ethyl vinyl acetate (EVA) copolymers). Typically these may be included as up to about 40% wt of the homopolymer-copolymer mixture layer, more generally up to about 25% wt, e.g. 18 to 22% wt.

The inclusion of polymers such as LDPE, EMA, EVA, and EBA may be used to balance the shrinkage behaviour of the shrink film in the machine direction (MD) and the transverse direction (TD). Of these, the HP copolymers such as EMA, EVA and EBA are preferred as elasticity may be improved and impact strength may be maintained or improved.

The shrink films of the invention may advantageously be multi-layer films, e.g. laminates or coextruded multi-layer films. These multi-layer films may be produced by conventional techniques. The layers (other than the linear low density ethylene homopolymer-copolymer mixture layer) may for example comprise LDPE, Ziegler Natta LLDPE, metallocene LLDPE, ethylene copolymers, polypropylene, and non-woven fabric. External polypropylene and fabric layers may be used to prevent fusion to or damage to the items being packaged by the shrink film.

The shrink film of the invention will typically be produced by extension through an annular die, blowing into a tubular film by forming a bubble which is collapsed between nip rollers after solidification. This film can then be slit, cut or converted (e.g. gusseted) as desired. Conventional shrink film production techniques may be used in this regard. Typically the homopolymer-copolymer mixture layer will be extruded through a die at a temperature in the range 160° C. to 240° C., and cooled by blowing gas (generally air) at a temperature of 10 to 50° C. to provide a frost line height of 2 to 8 times the diameter of the die. To obtain balanced shrink properties, the blow up ratio should generally be relatively high, e.g. in the range 2 to 5.

The shrink films of the invention may of course be used to wrap or encase items, e.g. books, magazines, bottles, etc and this forms a further aspect of the invention.

Viewed from a further aspect therefore the invention provides a process for wrapping an object comprising applying a shrink film about said object and shrinking said film by the application of heat thereto, characterized in that said film is a shrink film according to the invention.

Viewed from a further aspect the invention provides an object shrink wrapped with a shrink film according to the invention.

The shrink films of the invention are distinguished from prior art shrink films in their special combination of improved mechanical and shrink properties. During the film forming process a high degree of polymer chain entanglement will occur leading to increased toughness in the shrink film and to a highly oriented structure which provides improved shrinkage properties. Thus the films of the invention exhibit the following advantageous properties: low melt stress (low hot shrink force) reducing hole formation during shrinkage; high cold shrink force, leading to better holding by the shrunk film of objects packaged by it; improved mechanical properties for the shrink film, allowing more demanding (e.g. sharp edged) products to be shrink wrapped and/or allowing thinner films to be used (and hence allowing the amount of polymer wrapping to be reduced); and a matt surface. The matt surface of the film provides a non-blocking low friction surface without needing the use of additives to achieve such properties and makes it easier to handle the film and to open it during the film feeding step of shrink wrapping. The film is thus easier to use in automated processes.

Thus for a unilamellar shrink film of 150 μm in thickness, the following properties are preferred:

Dart drop: at least 650 g/50%

Tear resistance: at least 10N in the machine direction

Cold Shrink Force: at least 350 g, preferably at least 400 in both the machine direction transverse direction Hot shrink force: Less than 8 g in both the machine direction transverse direction.

Moreover for all shrink films of the invention shrinkage in the transverse direction should preferably be at least 15%, e.g. at least 20%.

The dart drop values of the shrink films of the invention are outstanding and never before have such high Dart Drop values been observed in shrink films. Thus, viewed from a still further aspect the invention provides a polyolefin shrink film, e.g. polyethylene shrink film having a Dart drop value (g)/film thickness (μm) of 5 or more, preferably 5.5 or more, especially 6 or more. Hence, Film 5 in the examples has a Dart drop value (g)/film thickness (μm) of 700/115=6.09 g/μm.

The shrink film in this embodiment should preferably comprise an ethylene homopolymer/copolymer mixture, particularly one in which its molecular weight distribution is in the range 5 to 40, and its weight average molecular weight is at least 100 kD. Such a shrink film is preferably unilamellar.

We have also found that in unilamellar form (i.e. single layer rather than multilayer or laminate form) shrink films formed using the homopolymer-copolymer mixture may be used for shrink wrapping both small and large objects and collections of objects. Thus viewed from a further aspect the invention provides a unilamellar polyethylene shrink film, characterized in that said polyethylene comprises an ethylene homopolymer-copolymer mixture having a molecular weight distribution in the range 5 to 40, and a weight average molecular weight of at least 100 kD (more preferably 200 to 280 kD, and especially 230 to 270 kD). Such films may typically have thicknesses of from 5 to 500 μm e.g. 100 to 200 μm.

The invention will now be described further with reference to the following non-limiting Examples.

Various terms and properties referred to herein are defined or determined as follows:

Molecular Weight Distribution (MWD): This is defined as Mw/Mn where Mw is the weight average molecular weight (in Daltons) and Mn is the number average molecular weight (in Daltons). These are determined by gel permeation chromatography.

$MFR_{2.16}$ and $MFR_{21.6}$ are melt flow rates determined at 190° C. according to ISO 1133.

Density is determined according to ISO 1183.

The hot and cold shrink forces have been measured in both Machine (MD) and Transverse (TD) directions in the following way. Specimens of 15 mm width and 200 mm length are cut out from the film sample in both MD and TD. The samples are tightly mounted into the jaws of the tensile cell in such a way that the distance between the jaws is 100 mm and the actual force is zero. The samples are then exposed to hot air at 250° C. in a closed chamber for 1 minute while the forces are measured. The maximum force is recorded represents the hot shrink force. The hot air chamber is removed while continuing to record the tensile force. The maximum force is again recorded and this second maximum represents the cold shrink force.

Shrinkage is measured in both Machine (MD) and Transverse (TD) directions in the following way. Specimens of 10 mm width and 50 mm length (Li) are cut out from the film sample in both MD and TD. The samples are placed on a preheated talcum bed and exposed at 160° C. in a heated oven with circulating air for 2 minutes. After the heat exposure, the residual length (Ls) of the samples is measured.

Calculation of the shrinkage in MD (machine direction/%)

$$\frac{L_i MD - L_s MD \times 100}{L_i MD}$$

Calculation of the shrinkage in TD (transverse direction/%)

$$\frac{L_i TD - L_s TD \times 100}{L_i TD}$$

Of which:

$L_i MD$=initial machine direction specimen length.

$L_s MD$=machine direction specimen length after shrinkage.

$L_i TD$=initial transverse direction specimen length.

$L_s TD$=transverse direction specimen length after shrinkage.

Calculation of Hot and Cold Shrink Forces (MD and TD)

$S = F/A$

Of which:

S=Shrink stress (p/mm$^2$)

F=Shrink force (p)

A=t×b (mm$^2$)

b=15 mm t=Average thickness out of three measurements on same sample (mm)

Impact Resistance (Determined on Dart-Drop (g/50%))

Dart-drop is measured using ISO 7765-1, method "A". A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated.

Puncture Resistance (Determined in Ball Puncture (Energy/J) at +23° C., −20° C. and −40° C.)

The method is according to ASTM D 5748. Puncture properties (resistance, energy to break, penetration distance) are determined by the resistance of film to the penetration of a probe (19 mm diameter) at a given speed (250 mm/min).

Tear Resistance (Determined as Elmendorf Tear (N))

The tear strength is measured using the ISO 6383 method. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Film Thickness Profile (2-Sigma/%)

In the laboratory the film thickness profile is measured by a non-touchable (capacitive) measuring (sensor) system from Octagon Process Technology. From this measurement one can also get average thickness, min./max. thickness, standard deviation and calculated tolerances expressed as 2-Sigma.

Outside and Inside Friction (cof)

Friction is measured according to ISO 8295. By definition it is the resistance to sliding between two surfaces lying in contact with each other. A distinction is made between Static friction which has to be overcome at the moment sliding motion begins and Dynamic friction which persists during a sliding motion at given speed.

EXAMPLE 1

Shrink Films

Three shrink films of 150 μm thickness were prepared by blown film extrusion as a monolayer film using a conventional film extruder. The extruder was equipped with a die of diameter 200 mm and die gap 1 mm. Film blowing took place at an extrusion temperature of 200° C., a blow up ratio of 1:3 and a frost line height of 900 mm. Film 1 was produced using an LDPE (FA3220 available from Borealis A/S) of $MFR_{2.16}$ (190° C.) 0.3 g/10 min and density 923 kg/m³. Film 2 was produced from a blend of 60% wt LDPE (FA 3220) and 40% wt of an LLDPE produced in a solution process having 1-octene as comonomer, $MFR_{2.16}$ (190° C.) 1.0 g/10 min. and density 919 kg/m³. Film 3 was produced using a broad MWD homopolymer-copolymer mixture according to the invention produced according to the technique of WO99/41310 using a slurry loop reactor followed by a gas phase reactor, having a density of 931 kg/m³, Mw 240 kD, $MFR_{2.16}$ (190° C.) 0.2 g/10 min, and MWD 22. The polymer for Film 3 comprised 59% wt of a low molecular weight homopolymer fraction with $MFR_{2.16}$ (190° C.) 300 g/10 min and density 970 kg/m³ and 41% wt of a high molecular weight copolymer fraction with $MFR_{2.16}$ (190° C.) <3 g/10 min and density <905 kg/m³. The shrinkage and mechanical properties of the three films were measured and the results are set out in Table 1 below.

TABLE 1

|  | Film 1 | Film 2 | Film 3* |
|---|---|---|---|
| Film thickness [μm] | 150 | 150 | 150 |
| Extrusion temperature [° C.] | 200 | 200 | 200 |
| Blow Up Ratio (BUR) [1:x] | 3 | 3 | 3 |
| Frost Line Height (FLH) [mm] | 900 | 900 | 900 |
| 1% Sec. modulus MD [MPa] | 160 | 160 | 300 |
| 1% Sec. modulus TD [MPa] | 170 | 160 | 330 |
| Free shrinkage at 160° C. MD [%] | 67 | 64 | 46 |
| Free shrinkage at 160° C. TD [%] | 38 | 30 | 20 |
| Hot shrink force MD [g] | 19 | 11 | 5 |
| Hot shrink force TD [g] | 5 | 2 | 1 |
| Cold shrink force MD [g] | 340 | 320 | 500 |
| Cold shrink force TD [g] | 300 | 330 | 500 |

TABLE 1-continued

|  | Film 1 | Film 2 | Film 3* |
|---|---|---|---|
| Dart Drop Index [g/50%] | 590 | 640 | 950 |
| Tear resistance MD [N] | 3.4 | 8.5 | 20 |

*of the invention

EXAMPLE 2

Shrink Films

Two shrink films of 115 μm thickness were prepared by blown film extrusion as co-extruded films with a conventional film extruder. The co-extrusion line was equipped with three extruders and a die having a die diameter of 200 mm and die gap of 1.0 mm. The film blowing took place at an extrusion temperature of 200° C. with a blow up ratio of 1:3.8 and frost line height of 900 mm.

Film 4 was prepared with all three layers being of the same material as Film 1. Film 5 was prepared with the outer layers being of the same material as Film 1 and the inner layer being of the same material as Film 3. The layer distribution of Film 5 was 30/40/30% (w/w/w). The shrinkage and mechanical properties of the two films were measured and the results are listed in Table 2 below.

TABLE 2

|  | Film 4 | Film 5* |
|---|---|---|
| Film thickness [μm] | 115 | 115 |
| Extrusion temperature [° C.] | 200 | 200 |
| Blow Up Ratio (BUR) [1:x] | 3.8 | 3.8 |
| Frost Line Height (FLH) [mm] | 900 | 900 |
| 1% Sec. modulus MD [MPa] | 150 | 220 |
| 1% Sec. modulus TD [MPa] | 160 | 250 |
| Free shrinkage at 160° C. MD [%] | 70 | 60 |
| Free shrinkage at 160° C. TD [%] | 48 | 36 |
| Hot shrink force MD [g] | 18 | 5 |
| Hot shrink force TD [g] | 6 | 2 |
| Cold shrink force MD [g] | 260 | 350 |
| Cold shrink force TD [g] | 250 | 340 |
| Dart Drop Index [g/50%] | 570 | 700 |
| Tear resistance MD [N] | 3.2 | 11.8 |

*of the invention

EXAMPLE 3

Shrink Film

Three shrink films of 50 μm thickness were prepared by blown film extrusion as co-extruded films with a conventional film extruder. The co-extrusion line was equipped with three extruders and a die having a die diameter of 200 mm and a die gap of 1.0 mm. The film blowing took place at an extrusion temperature of 200° C. with a blow up ratio of 1:3 and a frost line height of 900 mm.

Film 6 was produced with the same material in all layers, namely a LDPE with $MFR_{2.16}$ (190° C.) 0.7 g/10 min and density 927 kg/³ manufactured using a tubular high pressure process.

Film 7 was produced with the surface layers being of the same material as film 6 while the core layer was produced with the material used for Film 3. The layer distribution of this film was 25/50/25% (w/w/w).

Film 8 was produced with the same material in all layers, namely the material used for Film 3.

The shrinkage and mechanical properties of the three films were measured and the results are listed in Table 3 below.

TABLE 3

|  | Film 6 | Film 7* | Film 8* |
|---|---|---|---|
| Film thickness [μm] | 50 | 50 | 50 |
| Extrusion temperature [° C.] | 200 | 200 | 200 |
| Blow Up Ratio (BUR) [1:x] | 3 | 3 | 3 |
| Frost Line Height (FLH) [mm] | 900 | 900 | 900 |
| Tensile strength MD [MPa] | 32 | 48 | 57 |
| Tensile strength TD [MPa] | 27 | 38 | 44 |
| 1% Sec. modulus MD [MPa] | 205 | 250 | 290 |
| 1% Sec. modulus TD [MPa] | 215 | 290 | 370 |
| Free shrinkage at 160° C. MD [%] | 78 | 76 | 74 |
| Free shrinkage at 160° C. TD [%] | 26 | 18 | 16 |
| Hot shrink force MD [KPa] | 145 | 84 | 84 |
| Hot shrink force TD [KPa] | 11 | 5 | 0 |
| Cold shrink force MD [KPa] | 1850 | 2070 | 2520 |
| Cold shrink force TD [KPa] | 1400 | 1350 | 2010 |
| Dart Drop Index [g/50%] | 120 | 340 | 270 |
| Puncture, Total energy [J] | 3.3 | 6.0 | 4.6 |
| Tear resistance MD [N] | 2.4 | 1.5 | 1.5 |
| Haze [%] | 6.8 | 9.9 | 86 |
| Gloss [%] | 105 | 104 | 6.6 |

*of the invention

What is claimed is:

1. A process for wrapping an object comprising applying a shrink film about said object and shrinking said film by the application of heat thereto, wherein said film is a shrink film comprising a polyethylene film of thickness 5 to 500 μm, wherein said polyethylene comprises an ethylene homopolymer-copolymer mixture having an ethylene homopolymer component and a ethylene copolymer component, the ethylene homopolymer-copolymer mixture having a molecular weight distribution in the range 5 to 40 and a weight average molecular weight of at least 100 kD, the ethylene homopolymer component having a density of 960 to 980 kg/m³.

2. An object shrink wrapped with a shrink film comprising a polyethylene film of thickness 5 to 500 μm, wherein said polyethylene comprises an ethylene homopolymer-copolymer mixture having an ethylene homopolymer component and an ethylene copolymer component, the ethylene homopolymer-copolymer mixture having a molecular weight distribution in the range 5 to 40 and a weight average molecular weight of at least 100 kD, the ethylene homopolymer component having a density of 960 to 980 kg/m³.

3. The object shrink wrapped as claimed in claim 2, wherein the ethylene copolymer component has a density of 890 to 920 kg/m³.

4. The object shrink wrapped as claimed in claim 2, wherein the Mw of the ethylene homopolymer-copolymer mixture is 150 to 300 kD.

5. The object shrink wrapped as claimed in claim 2, wherein the Mw of the ethylene homopolymer-copolymer mixture is at least 230 kD.

6. The object shrink wrapped as claimed in claim 2, wherein the MWD of the ethylene homopolymer-copolymer mixture is in the range 10 to 35.

7. The object shrink wrapped as claimed in claim 6 wherein the MWD of the ethylene homopolymer-copolymer mixture is in the range 15 to 25.

8. The object shrink wrapped as claimed in claim 2, wherein the ratio of the ethylene homopolymer component to the ethylene copolymer component in the ethylene homopolymer-copolymer mixture is in the range 1:5 to 5:1 by weight.

9. The object shrink wrapped as claimed in claim 8 wherein the ratio of the ethylene homopolymer component to the ethylene copolymer component in the ethylene homopolymer-copolymer mixture is in the range 60:40 to 40:60 by weight.

10. The object shrink wrapped as claimed in claim 2, wherein the ethylene copolymer component comprises ethylene and 1-butene or ethylene and 1-hexene.

11. The object shrink wrapped as claimed in claim 2, wherein the ethylene copolymer component comprises an ethylene, 1-butene and 1-hexene terpolymer.

12. The object shrink wrapped as claimed in claim 2, wherein said film has a thickness of 20 to 120 μm.

13. The object shrink wrapped as claimed in claim 2, wherein said shrink film is a multilayer film.

14. The object shrink wrapped as claimed in claim 2, wherein said shrink film is unilamellar.

15. The object shrink wrapped as claimed in claim 14, said shrink film having a thickness of 100 to 200 μm.

16. The object shrink wrapped as claimed in claim 2, wherein said film exhibits at least 15% shrink in the transverse direction upon application of heat.

17. The object shrink wrapped as claimed in claim 13 wherein said multilayer film comprises a layer in which at least 95% wt is formed from said ethylene homopolymer-copolymer mixture.

18. The object shrink wrapped of claim 2, said shrink film having a Dart drop value (g)/film thickness (μm) of 5 g/μm or more.

19. The object shrink wrapped of claim 18, wherein the film is unilamellar.

20. The object shrink wrapped of claim 18, wherein Dart drop value (g)/film thickness (μm) is 6 g/μm or more.

21. The object shrink wrapped as claimed in claim 2, wherein the density of the homopolymer-copolymer mixture is 920 to 945 kg/m³.

22. The object shrink wrapped as claimed in claim 2, wherein the ethylene copolymer component has a density of 890 to 920 kg/m3, and wherein the Mw of the ethylene homopolymer-copolymer mixture is 150 to 300 kD.

* * * * *